Patented Feb. 25, 1947

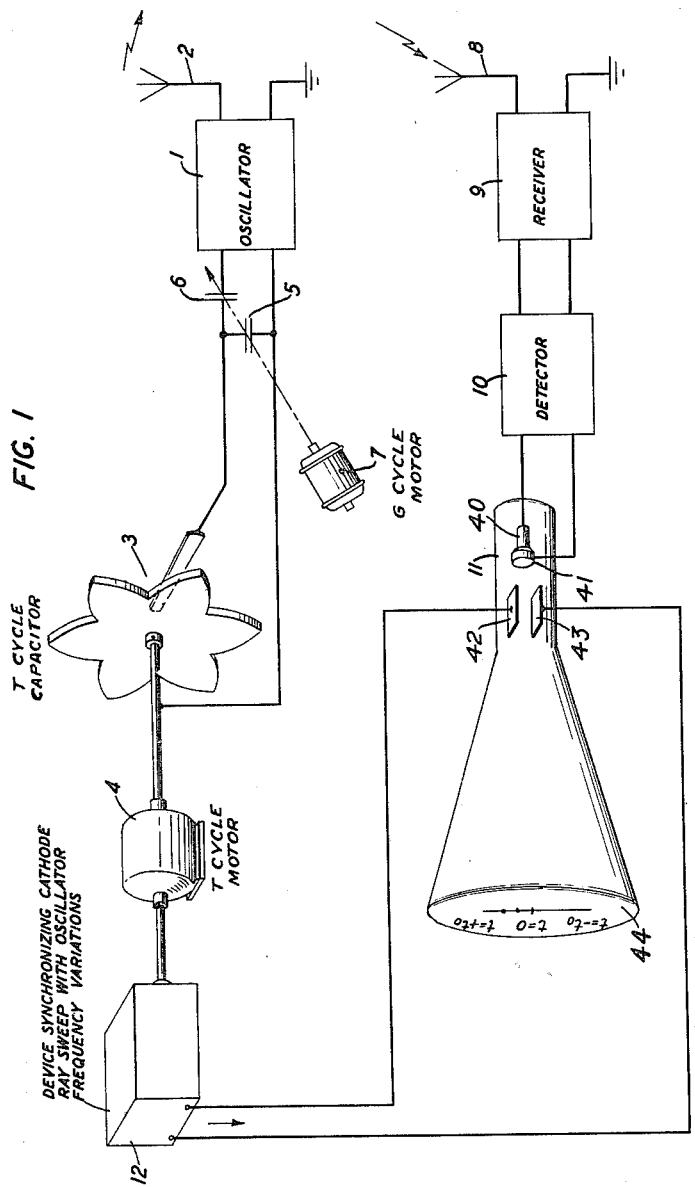

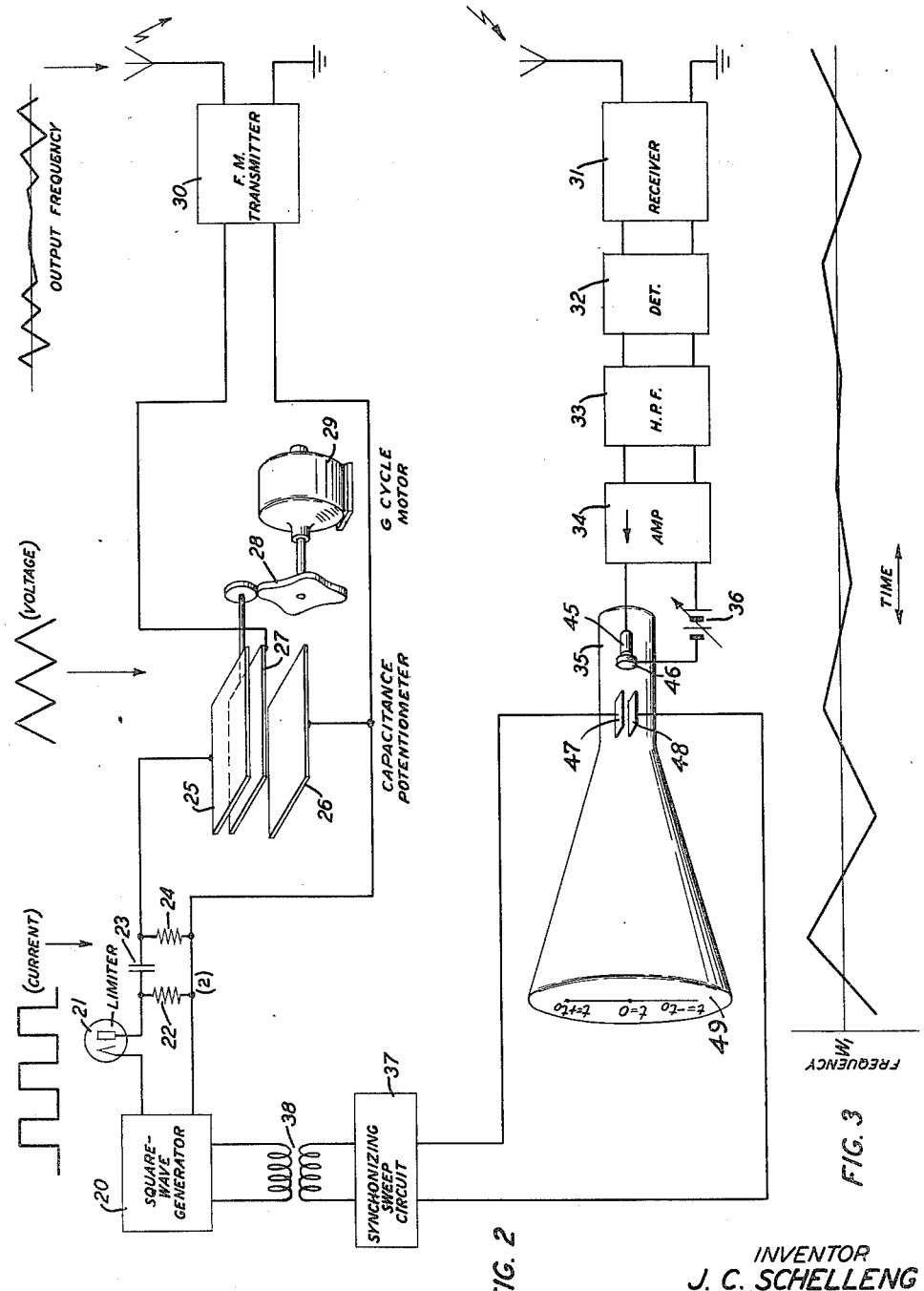

2,416,351

UNITED STATES PATENT OFFICE 2,416,351

POSITION LOCATING SYSTEM

John C. Schelleng, Interlaken, N. J., assignor to Bell Telephone Laboratories, Incorporated, New York, N. Y., a corporation of New York Application April 3, 1942, Serial No. 437,533

4 Claims. (Cl. 250—1)

This invention relates to distance measuring systems, and particularly to radio systems in which the frequency of the transmitted radio wave is regularly varied.

The object of the invention is a system which will indicate and measure the distance from a point to one or more objects.

A feature of the invention is a system of the varying frequency type in which the indication is proportional, not to the number of beats in the duration of a sweep of the transmitted frequency, but to the particular time in the sweep when the amplitude resulting from the beating phenomenon is greatest.

Another feature of the invention is a system in which the transmitted frequency is regularly and recurrently varied, and the rate of variation, or band width, is also regularly varied.

Another feature of the invention is a transmission system of any suitable nature such as an electrical, acoustical or mechanical system, in which a beat frequency disturbance is produced by the combination of an outgoing and an incoming wave, to determine a time period during the period of frequency variation in which the phase of the beat frequency disturbance is independent of the rate of variation in frequency of the outgoing wave.

The frequency of the radiated wave varies with time from a time $-t_0$ to a time $+t_0$. For convenience of description, the variation of frequency is preferably linear, though other types of variation are not excluded.

The rate of variation of the frequency is not constant and may have any value from $-g_0$ to $+g_0$. This variation also is preferably linear, though other types of variation are not excluded. Due to this variation in the rate of variation of the frequency, each sweep of the frequency will start with a slightly different value of $g$. For purposes of description we assume that the value of $g$ will be constant for one sweep and then change to a different value for the next sweep. The time for each sweep, or cycle of variation in the frequency of the radiated wave, is constant, thus the change in the rate of variation of the frequency causes a corresponding change in the width of the band of frequencies swept over.

The wave is radiated to a distant object, or objects, and reradiated to the receiving set near the transmitter. The instantaneous frequency of the wave is $W+gt$, while the phase is $Wt+\frac{1}{2}gt^2$, the word "phase" here meaning the argument of the sinusoidal function representing the wave.

The direct signal, plus the echoes or reradiated signals from several objects, will produce a current in the output of the receiver equal to $$\cos(Wt+\tfrac{1}{2}gt^2)+\Sigma a_n \cos[W(t-T_n)+\tfrac{1}{2}g(t-T_n)^2] \quad (1)$$

As the factors $a$, representing relative amplitude of the echoes, are usually small compared to unity, the total received signal will have the shape $$1+\Sigma a_n \cos(gT_n t - \tfrac{1}{2}gT_n^2 + WT_n) \quad (2)$$

in which $T_n$ represents the time delay of the nth echo.

This signal ignoring the unvaried portion represented by unity, is applied to a cathode ray oscilloscope having a retentive screen, to vary the intensity of the cathode ray. The cathode ray is swept horizontally in synchronism with the sweep of the frequency of the radiated waves.

Assuming that the screen of the cathode ray tube is selected to have sufficient time lag of the fluorescence so that the radiation produced by the first wave persists until the radiation is produced by the nth wave, the intensity of the total radiation, or the brightness of the spot on the screen, will be proportional to the summation of all the waves included in Equation 2.

$$\int_{-g_0}^{+g_0} \Sigma a_n \cos[gT_n t - \tfrac{1}{2}gT_n^2 + WT_n]dg - g_0 =$$

$$\Sigma 2 a_n g_0 \frac{\sin x}{x} \cdot \cos WT_n \quad (3)$$

where $$x = g_0(T_n t - \tfrac{1}{2}T_n^2)$$

The term $$\frac{\sin x}{x}$$

has the shape of a pulse with respect to $t$ and has maxima for $x=0$, or for $$t = \frac{T_n}{2}$$

The trace on the screen of the cathode ray oscilloscope will thus show a series of bright spots, one for each object, spaced along the trace proportionally to the various values of $$\frac{T_n}{2}$$

For simplicity, consider a single sweep of the frequency of the radiated wave, and a single object reflecting or reradiating the wave. From Equation 2, the beat signal in the receiver will be $$1+a\cos(gTt-\tfrac{1}{2}gT^2+WT) \quad (4)$$

At the time when $$t=\frac{T}{2}$$

and ignoring the constant unity, the signal will be $$a \cos WT$$

The output of the receiver at the time when $\cos WT = 1$ will equal $a$. Thus, at the time in the sweep in frequency of the radiated wave defined by $$t = \frac{T}{2}$$

the beat current will have its maximum value $a$, regardless of the rate of sweep $g$. Thus, as $g$ is varied, each successive sweep produces a maximum beat current at $$t = \frac{T}{2}$$

whereas for other times, the cosine term in Equation 4 is as apt to have a negative as a positive value, and the sum of the effects of a number of sweeps at any time other than $$t = \frac{T}{2}$$

will in general tend to be zero, or, at least, much smaller than the peak at $$t = \frac{T}{2}$$

In the drawings:

Fig. 1 diagrammatically shows in schematic form a radio system embodying the invention;

Fig. 2 shows another system embodying the invention; and

Fig. 3 is a diagram associated with Fig. 2.

The present system is generally similar to the system shown in United States Patent 2,045,071, June 23, 1936, L. Espenschied, thus a detailed description of the known components of the system is not necessary.

The oscillator 1, with, if desired, the usual power amplifiers, etc., radiates waves from the antenna 2. The variable capacitor 3, rotated by some suitable means, such as the motor 4, regularly varies or sweeps the frequency of the wave radiated from the antenna 2 over the band. The recurrent sweeps have the same time intervals, that is, the period of the sweeps is substantially constant.

The shunt capacitor 5, and series capacitor 6, varied by some suitable means, such as the motor 7, continually change the rate of variation of the frequency of the wave due to the capacitor 3. Preferably the capacitors 5 and 6 produce a linear variation in the rate of variation, or band width, extending over a number sweeps, though other types of variation may be used.

The waves reflected, or reradiated, from the distant object, or objects, together with waves directly transmitted from the antenna 2, are received on the antenna 8, selected by the receiver 9, and combined to produce a signal current of beat frequency by the detector 10

The output of the detector 10 is applied to the cathode 40 and control grid 41 of a cathode ray oscilloscope 11 and varies the density of the cathode ray, and the intensity of the spot produced on the screen, in accordance with the amplitude of the detected output.

Only one set of deflecting plates 42, 43 is required, and these are connected to some suitable device 12, such as a kick coil or a variable potentiometer, which may be controlled by the motor 4, to cause the cathode ray to sweep across the screen 44 isochronously with the frequency sweep due to the capacitor 3. As the beat current due to the direct and reflected waves cannot begin to form until the time T after the beginning of the sweep, the oscillator sweep should start in advance of the nominal start of the sweep of the cathode ray.

On the screen 44 of the cathode ray oscilloscope, a dim line, due to the sweep, will be formed, with bright spots corresponding to the distances of the one, or more, objects reflecting or reradiating the waves.

In Fig. 2, the generator 20, which may be the known multivibrator or other similar device, generates a square-topped wave. This wave is supplied to the limiter 21 and load resistance 22. The function of limiter 21 is to supply constant current to resistor 22 during half the cycle of the square wave generator. A capacitor 23 and resistor 24 are connected across the load resistor 22. The circuit is designed so that the voltage across the resistor 24 will be a saw-toothed wave having the same frequency as the square-topped wave from the generator 20.

The voltage developed across the resistor 24 is applied to the stationary plates 25, 26 of a three-plate capacitor. The third plate 27 is moved, parallel to the stationary plates 25, 26, by suitable means, such as the cam and cam follower 28 driven by the motor 29 at the speed of the $g$ cycle. The variable capacitor formed by the plates 25, 26, 27 forms a capacitance potentiometer. Thus the voltage between the plates 26, 27 varies with the position of the plate 27. The voltage between the plates 26, 27 is applied to a conventional frequency modulated transmitter 30 to produce a wave varying in frequency, the frequency of the sweep being determined by the frequency of the square wave generator 20, and the rate of variation during the sweep or band width being determined by the position of the plate 27 under the control of the motor 29. The resultant variation in frequency of the transmitted wave is illustrated in Fig. 3.

The wave, or waves, reflected or reradiated by one or more objects, together with directly transmitted waves, are selected by the receiver 31, and detected by the detector 32. The output of the detector 32 will be a difference frequency current having peak amplitudes representing the different objects. This output may be filtered in the high pass filter 33 to remove non-essential low frequency components, amplified, if desired, in the amplifier 34 and applied to the cathode 45 and control grid 46 of a cathode ray oscilloscope 35. An adjustable bias battery 36 may be included in the output circuit of the amplifier 34 to adjust the average or unmodulated density of the cathode beam, or intensity of the trace on the screen 49.

The transformer 38 is supplied with energy from the output of the generator 20 and supplies a starting pulse to the sweep circuit 37. The sweep circuit 37 supplies deflecting voltage to the deflecting plates 47, 48 of the cathode ray oscilloscope 35.

What is claimed is:

1. The method of determining the distances of a plurality of objects which includes generating an oscillatory current, varying the frequency of said current over successive bands of variable width, radiating a wave produced by said current to said objects, receiving waves reflected by said objects, combining the currents due to said received waves with a current due to a directly transmitted wave, detecting said currents to produce a difference frequency current, controlling the intensity of an electronic beam by the output of said detection and controlling the position of said beam synchronously with the variations in said oscillatory current.

2. In a system for locating a plurality of objects, a source of oscillatory current, means including a variable capacitor for varying the frequency of said current over successive bands of variable width, antenna means for radiating a wave produced by said current, other antenna means for receiving waves reflected by said objects and waves directly transmitted from said first antenna means, a receiver for combining said waves to produce a current of difference frequency having recurrent peak amplitudes corresponding to said objects, a cathode ray oscilloscope having a cathode, a control electrode, two deflecting electrodes and a retentive screen, means for applying said current of difference frequency to said cathode and control electrode, and means to apply current varying with the variations in said oscillatory current to said deflecting electrodes, whereby the positions of said objects are manifested as bright spots in a straight line on said screen.

3. In a system for measuring distances, a generator of square-topped electrical waves, a rectifier and a resistor in serial relationship connected across the output of said generator, a capacitor and a second resistor in serial relationship connected across said first resistor, a three-plate capacitor, having the outer plates connected across said second resistor, a frequency modulated radio transmitter, means for connecting the central and one of the outer plates of said three-plate capacitor to control the frequency of the waves radiated by said transmitter to a plurality of objects, means including a motor for moving said central plate to and fro with respect to said outer plates, a means for receiving waves reflected by said objects and waves directly from said transmitter, detecting means for combining said waves to produce a current of difference frequency, a cathode ray oscilloscope having a cathode, a control electrode, two deflecting electrodes and a retentive screen, means for connecting the output of said detecting means to said cathode and said control electrode, means energized by said generator and connected to said deflecting electrodes to sweep the ray in said oscilloscope whereby the distances of said objects are manifested as bright spots in a straight line on said screen.

4. The method of determining the distances to a plurality of objects which includes generating oscillatory energy, periodically varying the frequency of said energy, regularly modifying the rate of said periodical variation, transmitting a portion of said energy to said objects, receiving energy returned from said objects, combining the received energy with a portion of the generated energy to produce energy of beat frequency, determining from said beat frequency energy the time during the period of frequency variation when the phase of the beat frequency energy is independent of the rate of frequency variation and indicating by said determination the distances to said objects.

JOHN C. SCHELLENG.

REFERENCES CITED

The following references are of record in the file of this patent:

UNITED STATES PATENTS

| Number | Name | Date |
| --- | --- | --- |
| 2,045,071 | Espenschied | June 23, 1936 |
| 2,034,769 | Osnos | Mar. 24, 1936 |
| 2,205,190 | Farrington | June 18, 1940 |
| 2,007,099 | Usselman | July 2, 1935 |